United States Patent [19]

Wernicke et al.

[11] Patent Number: 4,515,678

[45] Date of Patent: May 7, 1985

[54] PROCESS AND CATALYST FOR THE HYDROGENATION OF COAL

[75] Inventors: Hans J. Wernicke, Wolfratshausen-Waldram; Heinz Zimmerman, Munich, both of Fed. Rep. of Germany

[73] Assignee: Linde Aktiengesellschaft, Hollriegelskreuth, Fed. Rep. of Germany

[21] Appl. No.: 435,431

[22] Filed: Oct. 20, 1982

[51] Int. Cl.³ .............................................. C10G 1/06
[52] U.S. Cl. ..................................................... 208/10
[58] Field of Search ........................................... 208/10

[56] References Cited

U.S. PATENT DOCUMENTS

| | | | |
|---|---|---|---|
| 4,169,038 | 9/1979 | Metrailer et al. | 208/10 |
| 4,176,041 | 11/1979 | Mori et al. | 208/10 |
| 4,210,518 | 7/1980 | Wilson et al. | 208/10 |
| 4,214,977 | 7/1980 | Ranganathan et al. | 208/10 X |
| 4,339,329 | 7/1982 | Kageyama et al. | 208/10 |
| 4,354,919 | 10/1982 | Oi et al. | 208/10 |

FOREIGN PATENT DOCUMENTS

| | | | |
|---|---|---|---|
| 50-38702 | 4/1975 | Japan | 208/10 |
| 53-105504 | 9/1978 | Japan | 208/10 |
| 55-112291 | 8/1980 | Japan | 208/10 |
| 55-116794 | 9/1980 | Japan | 208/10 |
| 56-136885 | 10/1981 | Japan | 208/9 |

OTHER PUBLICATIONS

Engineering Control of Air Pollution, Air Pollution 3rd Edition, Stern, U. of N.C., Chapel Hill, N.C. Academic Press 1977.

*Primary Examiner*—Delbert E. Gantz
*Assistant Examiner*—William G. Wright
*Attorney, Agent, or Firm*—James C. Wray

[57] ABSTRACT

Blast furnace flue dust is used as a catalyst in a process for the hydrogenation of coal. A flowable mixture of finely divided coal particles and liquid hydrocarbons is brought to high pressure and to reaction temperature. The mixture is hydrogenated with hydrogen in the presence of blast furnace dust as a hydrogenation catalyst. The cost-effective hydrogenation catalyst is reused profitably subsequent to application in the coal hydrogenation process.

Gaseous products are separated from liquid and solid reaction products. Liquid products are vaporized and are fractionated under atmospheric pressure and under vacuum. Hydrogen for use in the hydrogenation is produced by partial oxidation of the residue, and the catalyst is deposited as slag, which is returned to the blast furnace.

4 Claims, 1 Drawing Figure

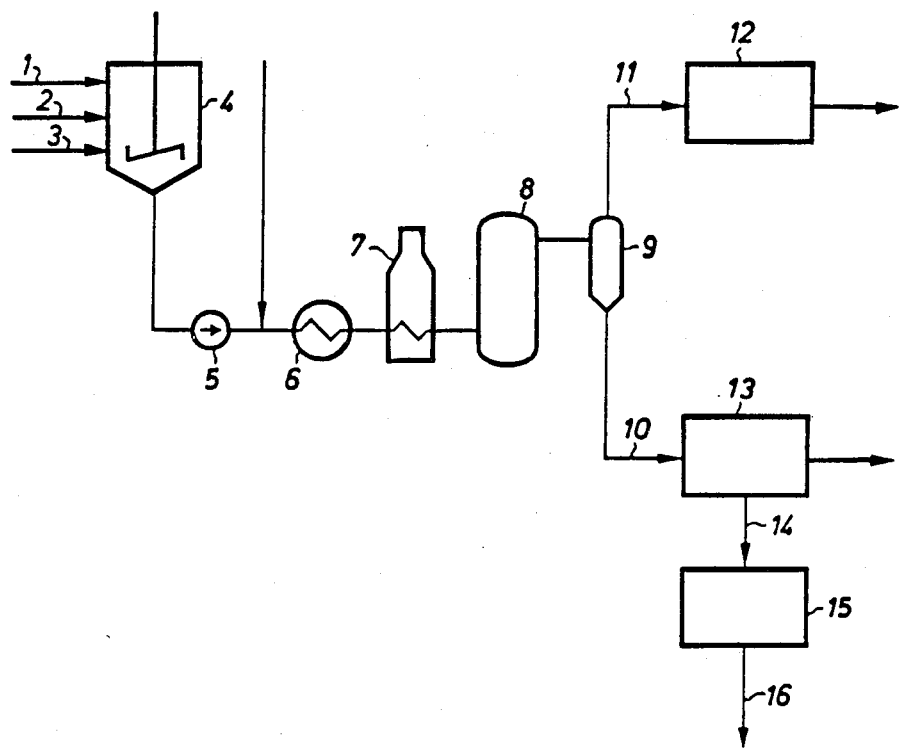

PROCESS AND CATALYST FOR THE HYDROGENATION OF COAL

BACKGROUND OF THE INVENTION

The invention relates to a process of coal hydrogenation in which a flowable mixture of finely divided coal particles and liquid hydrocarbons are brought to a high pressure and reaction temperature and are hydrogenated with hydrogen in the presence of the hydrogenation catalyst, whereupon the gaseous products are separated from liquid and solid reaction products.

Conventionally, finely dispersed catalysts are used for hydrogenation. In the past, the employed catalysts were mainly materials containing iron oxide (e.g. Bayermass, Luxmass or iron ore), tin oxalate, cobalt molybdate and others (partly in combination with cocatalysts), having a concentration of up to 6% by weight calculated on dry coal usage (Fuel Processing Technology, 2 (1979) 235 to 251).

The catalysts used in the coal hydrogenation are used only once, as their separation from the liquefied product can be effected only together with the unconverted coal or its mineral portion, respectively. For this reason, after treatment of the hydrogenation product, and eventually possibly after partial oxidation of the residue, the catalysts are deposited as slag and are discarded.

A need persists for a cost-effective suitable hydrogenation catalyst which can be reused after it is used in the coal hydrogenation process, thereby realizing savings in cost over conventional hydrogenation catalysts.

SUMMARY OF THE INVENTION

The present invention uses as a hydrogenation catalyst the flue dust generated in blast furnace processes for reducing iron ore.

In searching for an alternate, inexpensive hydrogenation catalyst, flue dust was considered very favorably. The flue dust is generated in large quantities in blast furnace processes. It has high iron content. Unlike the usual Bayermass used in conventional processes, the flue dust is not corrosive. In spite of its high iron content, blast furnace flue dust still has low specific gravity. Interruptions incurred by depositing catalysts in the hydrogenation reaction are avoided. Moreover, further tests have shown that flue dust has high hydrogenation activity and can be employed advantageously as a cost-effective catalyst in the coal hydrogenation processes.

Conventionally, flue dust is sintered in lumps and is returned to the blast furnace process. In using blast furnace flue dust as a hydrogenation catalyst, in accordance with the invention, the dust is "lent" to the coal hydrogenation process before being returned to the blast furnace. In contrast to conventional hydrogenation catalysts, flue dust when used in accorance with the invention is not discarded after coal hydrogenation, but is put to profitable reuse.

Appropriately, blast furnace flue dust is added to the finely divided coal particles and liquid hydrocarbons, serving to make a mixture of the coal, at a rate of about 0.5 to 10% by weight, preferably about 2 to 3% by weight of blast furnace dust in relation to the dry coal in the mixture.

In accordance with a preferred process coal hydrogenation is carred out at temperatures of about 300°–500° C., preferably at about 350° to 450° C., and at pressures of about 100 to 300 bar, preferably about 140 to 200 bar.

Because of its high hydrogenation activity, reaction conditions are reached by the blast furnace flue dust catalyst before another catalyst, Bayermass for example, can reach its full hydrogenation activity. This results in considerable energy and cost savings and savings in plant design.

In a further variation of the inventive process, after separation of the gaseous products and liquid and solid reaction products, and subsequent separation of the liquid products by boiling under atmospheric pressure and under vacuum, the remaining residue undergoes partial oxidation. In addition, the process provides that the cinder, slag or ash product resulting from partial oxidation is returned to the blast furnace process. Sintering of the blast furnace flue dust, which is required before returning flue dust to the blast furnace can be dispensed with, since the final product of the partial oxidation is in lump form. That results in further cost savings for the blast furnace process.

The present process of coal hydrogenation combines a flowable mixture of finely divided coal particles and liquid hydrocarbons, pressurizes the mixture to high pressure and heats the mixture to reaction temperature, hydrogenates the mixture with hydrogen in the presence of blast furnace flue dust as a hydrogenation catalyst, and separates gaseous products from liquid and solid reaction products. In preferred embodiments abut 0.5 to 10% by weight, preferably about 2 to 3% by weight of blast furnace flue dust, calculated on the input of dry coal, is added to the mixture of finely divided grained coal particles and liquid hydrocarbons. In preferred embodiments the coal hydrogenation is carried out at temperatures of about 300° to 500° C., preferably at about 350° to 450° C., and at pressures of about 100 to 300 bar, preferably at about 140 to 200 bar.

After separation of the gaseous products from the liquid and solid reaction products and after further separation by distilling the liquid products under atmospheric pressure and under vacuum, the remaining residue is passed to partial oxidation. Ash resulting from the partial oxidation is returned to a blast furnace. The present invention provides hydrogenating coal with hydrogen in the presence of blast flue dust as a catalyst. Preferably, the blast furnace flue dust catalyst is mixed with coal prior to hydrogenating. Finely divided coal, liquid hydrocarbon and blast furnace dust catalyst are flowed together into the reactor. Following conversion gaseous products are separated from liquid and solid products. Useful products are distilled from the liquid and solid products. A distillation residue is partially oxidized. Ash from the partial oxidizing step is returned to a blast furnace.

This invention provides a new and unobvious coal hydrogenation catalyst which is blast furnace flue dust.

These and further and other objects, features and details of the invention are apparent in the disclosure which includes the specification, with the above and ongoing description and claims and drawings.

BRIEF DESCRIPTION OF THE DRAWING

The drawing is a schematic illustration of a preferred embodiment of the invention.

DETAILED DESCRIPTION OF THE DRAWING

In the procedure schematically depicted, finely ground coal particles are introduced via line 1. Catalyst is introduced via line 2, and they are admixed with the liquid hydrocarbons from line 3 to form a mixture in mixer 4. The catalyst is added in an amount of about 0.5 to 10% of the coal by weight, preferably about 2 to 3% by weight. The coal is dried and ground to a particle size of less than 0.1 mm. A separated fraction of coal liquefaction products can be used for the liquid hydrocarbon in the mixture.

The coal mixture produced in mixer 4 is brought to a reaction pressure of about from 100 to 300 bar, preferably about from 140 to 200 bar, at 5, and then is brought to reaction temperature in a conventional manner by way of heat exchanger 6 and furnace 7, and is passed to hydrogenation reactor 8.

Hydrogen from any suitable source, such as for example from the later described partial oxidation source is added to the reactor directly. Alternately hydrogen may be flowed through the heat exchanger 6 and furnace 7 as shown by the arrow in the drawing. The solid coal particles present in the suspension are converted to gaseous and liquid components in hydrogenation reactor 8. Initially, the products are separated in heat separator 9 into a gas phase and a liquid phase. The liquid phase is withdrawn via line 10. The gaseous reaction products are withdrawn from heat separator 8 via line 11 and are further processed at 12.

The liquid products of heat separator 9 are withdrawn via line 10 and are further processed 13. The residue produced which cannot be fractionated not only contains the hydrocarbons but also contains unconverted coal and the catalysts and is passed via line 14 to partial oxidation 15, in which the hydrogen required for the hydrogenation is produced. Subsequent to partial oxidation, the slag containing the iron component of the flue dust is drawn off via line 16 and is passed to the blast furnace. The sintering of the flue dust, normally part of the blast furnace process, can be dispensed with, as the slap of the partial oxidation is already in lump form.

To demonstate the advantages of flue dust over other catalysts used in coal liquefaction, comparative tests were performed. The catalysts used in this comparison were re mud (notschlamm), Bayermass and blast furnace flue dust. Coal input in each case was the identical Saar bituminous coal of equal particle size. To simplify, all mixtures used as liquid hydrocarbon, Dekalin (Decahydronaphthalene—$C_{10}H_{18}$), whereby a coal mixture consisting of about 60% by weight of Dekalin and 40% by weight of coal was produced. The results are compiled in the following Tables I–III.

TABLE I

DEPENDENCE OF ACTIVITY ON CATALYST TYPE

| Catalyst* | Red Mud | Bayermass | Blast Furnace Flue Dust |
|---|---|---|---|
| Temperature °C. | 400 | 400 | 400 |
| Pressure bar | 160 | 160 | 160 |
| Dekalin/coal g/g | 1.67 | 1.76 | 1.71 |
| Hydrogenation yield % (weight) | 11.8 | 32.1 | 43.3 |

TABLE II

TEMPERATURE DEPENDENCE OF ACTIVITY WITH BLAST FURNACE FLUE DUST*

| Temperature | 350° C. | 400° C. | 450° C. |
|---|---|---|---|
| Pressure bar | 160 | 160 | 160 |
| Dekalin/coal g/g | 1.67 | 1.71 | 1.67 |
| Hydrogenation yield % (weight) | 19.2 | 43.3 | 38.9 |

TABLE III

DEPENDENCE OF YIELDS OF CATALYST CONTENTS WITH BLAST FURNACE FLUE DUST

| % (Weight) Flue Dust Coal | 2.82 | 6.06 |
|---|---|---|
| Temperature °C. | 400 | 400 |
| Pressure bar | 160 | 160 |
| Hydrogenation yield % (weight) | 43.2 | 47.2 |

*Catalyst quantity: 2.6–2.8% by weight, respectively, calculated on dry coal

The weight percent values given in Tables I–III refer to dry coal inputs. The term hydrogenation yield refers to the distillable liquid hydrocarbons after withdrawal of the Dakalin used for mixing as compared to the coal input. The gaseous products are not included in the comparison.

Of the tested waste products from technical processes, namely blast furnace flue dust, red mud, and Bayermass, blast furnace flue dust shows considerable catalytic hydrogenation activity in hydrogenating coal liquefaction. Forty to fifty percent, by weight, of the coal input can be converted into distillable products. Under equal hydrogenation conditions, blast furnace flue dust has a higher catalytic activity when compared to red mud and Bayermass.

While the invention has been described with reference to specific embodiments, modifications and variations of the invention, may be employed without departing from the scope of the invention, as defined in the claims.

That which is claimed is:

1. The process of coal hydrogenation consisting essentially of combining a flowable mixture of blast furnace flue dust, finely divided coal particles and liquid hydrocarbons, pressurizing the mixture to high pressure and heating the mixture with hydrogen so that the blast furnace flue dust acts as a hydrogenation catalyst, separating gaseous products and liquid and solid reaction products, separating by boiling the liquid products under atmospheric pressure and under vacuum and passing the remaining residue to partial oxidation, partially oxidizing the residue, producing hydrogen and slag containing the blast furnace flue dust catalyst, drawing off the slag containing the flue dust catalyst from the partial oxidation slag, returning slag resulting from the partial oxidation and
   containing the catalyst to a blast furnace, and reusing the blast furnace flue dust catalyst from the hydrogenation in the blast furnace.

2. The process according to claim 1, characterized in that about 0.5 to 10% by weight, preferably about 2 to 3% by weight of blast furnace flue dust, calculated on the input of dry coal, is added to the mixture of finely divided coal particles and liquid hydrocarbons.

3. The process according to claim 1 or 2, characterized in that the coal hydrogenation is carried out at temperatures of about 300° to 500° C., preferably at about 350° to 450° C., and at pressures of about 100 to 300 bar, preferably at about 140 to 200 bar.

4. The process of claim 1 wherein the blast furnace flue dust is untreated.

* * * * *

UNITED STATES PATENT OFFICE
CERTIFICATE OF CORRECTION

PATENT NO. : 4,515,678

DATED : May 7, 1985

INVENTOR(S) : WERNICKE et al.

It is certified that error appears in the above-identified patent and that said Letters Patent are hereby corrected as shown below:

On the title page insert:
"Priority data: Federal Republic of Germany 31 42 825 filed: 10/29/81"

Signed and Sealed this

Eighth Day of October 1985

[SEAL]

Attest:

Attesting Officer

DONALD J. QUIGG

Commissioner of Patents and Trademarks—Designate